United States Patent Office 2,895,940
Patented July 21, 1959

2,895,940

OZONE INHIBITORS

Harold Tucker, Parma, Ohio, assignor to The B. F. Goodrich Company, New York, N.Y., a corporation of New York No Drawing. Application August 22, 1957
Serial No. 679,774

8 Claims. (Cl. 260—45.9)

This invention relates to a class of chemicals effective in retarding the deterioration of vulcanized elastomers when placed under stress, and to vulcanized elastomers which have been so protected by that class of chemicals, which class of chemicals are not only excellent ozone inhibitors but are also substantially non-staining and non-discoloring ozone inhibitors.

Extensive experimentation has demonstrated that ozone does not have any marked deteriorating effect upon properly vulcanized elastomers when such elastomers are not under stress, but that ozone does have a marked deteriorating effect on such elastomers when they are under stress. This deteriorating effect exhibits itself in the form of cracks in the surface of the stressed vulcanized elastomer, which cracks both spread and progress inwardly from the surface to a greater and greater depth and commonly are the focal points for failure caused by fatigue of the vulcanized elastomer under stress.

Many products comprising vulcanized elastomers are subjected to stresses during use. In fact, any such vulcanized elastomer product which undergoes stretching, bending, flexing, compression, and the like, has at least the surface layers of the vulcanized elastomer, i.e. those in contact with atmospheric ozone, under stress and susceptible to ozone cracking. There is consequently a need for an effective ozone inhibitor for vulcanized elastomer products that are subjected to stresses.

Thus, in inflated pneumatic tires in which the vulcanized elastomer of the tread and sidewalls is under continuous stress, the ozone of the atmosphere first causes minute surface cracks, which cracks always enlarge and progress inwardly to the fabric plies, permitting moisture and air to rot and/or to weaken the fabric to a degree that causes a premature failure of the pneumatic tire.

In many of such vulcanized elastomer products, it is highly desirable that the ozone inhibitor be non-staining and non-discoloring. Thus, in white sidewall pneumatic tires, not only should the vulcanized elastomer of the white sidewall be so protected, but also the vulcanized elastomers of the underlying sidewall and carcass should likewise be protected by a non-staining and non-discoloring ozone inhibitor. This is important because of the fact that any effectiveness of an ozone inhibitor is dependent on its slow and continuous migration to the surface of the vulcanized elastomer containing it, and where a white surface layer of vulcanized elastomer is vulcanized to an underlying elastomer, the ozone inhibitor slowly migrates from the underlying layer into and through the white sidewall layer, and, if the ozone inhibitor is a staining and discoloring chemical, which ozone inhibitors heretofore employed normally are, the white sidewalls are stained and discolored.

The ozone inhibitors of this application are not only effective ozone inhibitors but are also non-staining, non-discoloring ozone inhibitors. In so far as applicant can ascertain, effective non-staining, non-discoloring ozone inhibitors have not heretofore been known in the rubber industry.

The problem of ozone deterioration of vulcanized elastomers when under stress has received much study over the years. The adverse action of ozone on vulcanized elastomers under stress has been established by extensive experimentation to be different in kind and distinctly separate from the deteriorating effects on vulcanized elastomers of oxygen and sunlight, two major deteriorating agents in the atmosphere. These extensive tests give conclusive evidence that commercial antioxidants for elastomers, and other hydrocarbons, such as gasoline and lubricating oils, are ineffective as ozone inhibitors for vulcanized elastomers, and show that the most effective amine antioxidants are not effective non-staining, non-discoloring ozone inhibitors. Conversely, experimentation has demonstrated that the ozone inhibitors of this application are not effective antioxidants in vulcanized elastomer products. There is a clear indication in these tests that the same chemical will not serve both as an effective antioxidant and an effective ozone inhibitor.

I have discovered that a class of chemicals having the generic formula

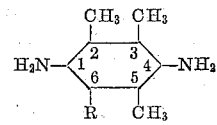

in which R is an alkyl radical having from 2 to 18 carbon atoms, namely, 1,4-diamino-2,3,5-trimethyl-6-alkylbenzenes in which each of the alkyl groups are attached to a different carbon atom of the benzene nucleus, and no alkyl group is attached to a nitrogen of either of the amino groups, are effective non-staining, non-discoloring ozone inhibitors in vulcanized elastomers, whether natural or synthetic.

It has been demonstrated that a migratory ozone inhibitor, namely, one that slowly blooms to the surface of the vulcanized elastomer and continuously provides a protective surface film of the ozone inhibitor to counteract the deteriorating effect of ozone at the surface of the vulcanized elastomer, is more effective.

My tests indicate that all the ozone inhibitors of this application have migratory rates adequate to impart effective protection against ozone deterioration. The make-up of the recipe of the vulcanized elastomer product also affects the rate of migration of the ozone inhibitor. Thus, a migratory wax in the recipe, such as carnauba, ceresin, montan, paraffin and similar synthetic waxes, assists in the migration of the ozone inhibitor to the surface of the vulcanized elastomer.

Thus, each of the ozone inhibitors of this application, in which the R of the above generic formula is an alkyl group having 2 or more carbon atoms, is an ozone inhibitor which has a satisfactory rate of migration. For example, where the alkyl group of the 1,4-diamino-2,3,5-trimethyl-6-alkylbenzene is a straight chain alkyl group, such as ethyl, n-propyl, n-butyl, n-dodecyl and the like, the 1,4-diamino-2,3,5-trimethyl-6-alkylbenzene is an excellent ozone inhibitor, and where the alkyl group is a branched chain alkyl group, such as isopropyl, isobutyl, iso-hexyl or 4-methylpentyl, 4-ethyl-5,5-dimethylhexyl, 3-cyclohexylpropyl, and the like, the 1,4-trimethyl-6-alkylbenzene is a definitely superior ozone inhibitor. The term "alkyl" is herein used in a broad sense to include straight chain, branched chain and cycloalkyl hydrocarbon radicals.

The term "rubbery diolefin polymer" is employed in this application in a broad generic sense to include all natural and synthetic unsaturated rubbery diolefin polymers whether or not admixed with fillers, pigments, vulcanizing and/or accelerating agents and the like, examples of such rubbery diolefin polymers including the various natural rubbers, which are naturally occurring diene polymers, and synthetic rubbers which are polymers of conjugated dienes, such as butadiene-1,3, isoprene, piperylene, and other butadiene-1,3-hydrocarbons, chloroprene, cyano-butadiene-1,3 and the like, as well as copolymers of the conjugated dienes with each other or with other compounds copolymerizable therewith, such as styrene, chlorostyrene, isobutylene, acrylonitrile, methacrylonitrile, acrylic and methacrylic acids, alkyl acrylates, vinylidene chloride, vinyl pyridine and the like. The term "elastomer" is herein sometimes employed to designate any of the rubbery diolefin polymers as hereinabove defined. The term "vulcanized elastomer" is herein sometimes employed to designate an elastomer to which has been imparted increased tensile strength by admixing it with other ingredients, with or without heating the admixture of elastomer and such other ingredients.

The amount of the ozone inhibitor that may be effectively employed in elastomer admixtures ranges from 0.5 to about 10 weight percent based on the elastomer, whereas to obtain maximum value of the ozone inhibitor, an amount ranging from about 0.5 to 5 weight percent will generally give adequate protection.

A number of methods for testing the efficacy of an ozone inhibitor in a vulcanized elastomer product have been proposed but none has been generally accepted. In testing the efficacy of the ozone inhibitors of this application a method which has demonstrated its effectiveness over a long period of time is employed. This method is hereinbelow described.

TEST FOR OZONE INHIBITING EFFICIENCY

Test pieces are made from vulcanizable elastomer compositions, one or more containing no ozone inhibitor and one or more containing the ozone inhibitor, to be tested, by vulcanizing 6" x 6" x 0.075" sheets of the elastomer compositions between 0.001" sheets of aluminum foil for 60 minutes at 284° F. The aluminum foil is stripped off the cured test pieces about 24 hours prior to outdoor exposure. The cured test pieces, so prepared, are mounted on racks in bent loop form in accordance with ASTM-D518-44-Method B. The test pieces are placed outdoors during the middle of a given day with the racks inclined at a 45° angle to the horizontal, so that the tops of the bent looped test pieces face south. All ratings are based on the number of cracks intersecting a line 1 cm. in length in the direction of strain on the test piece. The number of cracks so determined is the crack frequency "F." After a moderate amount of cracking has occurred, as judged by a visual examination, the number of days of exposure being indicated by "t," a count of the crack frequency F is made by placing a template on the bent test piece at three places across the top face of the bent test piece in zone of maximum curvature. The number of cracks per centimeter at each place is counted and the average of the three counts is used as the value of F. A division of F by t, or F/t, is termed "the reduced crack frequency," the lower the F/t value, the higher the efficacy of the ozone inhibitor. A rule of thumb for determining the effectiveness of the ozone inhibitor is this: If the F/t for the control divided by F/t for the test piece is equal or greater than 2.5, then it may be assumed that the ozone inhibitor of the test piece is an effective ozone inhibitor.

It is here pointed out that the preparation of the ozone inhibitors forms no part of the invention of this application. A preferred method of preparing 1,4-diamino-2,3,5-trimethyl-6-ethylbenzene is to start with pseudocumene, which may be said to be 1,2,4-trimethylbenzene. The latter is acetylated with acetic anhydride and the ketone thus formed is reduced to form 1,2,4-trimethyl-6-ethylbenzene, which is nitrated to produce 1,4-dinitro-2,3,5-trimethyl-6-ethylbenzene, and then reduced to form the 1,4-diamino-2,3,5-trimethyl-6-ethylbenzene. Other 1,4-diamino-2,3,5-trimethyl-6-alkylbenzenes may be similarly prepared.

OZONE INHIBITOR TESTS

For the purpose of testing the efficiency of the 1,4-diamino-2,3,5-trimethyl-6-alkylbenzenes of this application, the following standard tire tread recipe is employed:

TEST RECIPE

| Ingredients: | Parts by weight |
|---|---|
| Elastomer, as indicated in tests below | 100 |
| Carbon black (HAF) | 50 |
| Zinc oxide | 5 |
| Stearic acid | 2 |
| Sulfur | 3 |
| Mercaptobenzothiazole | 1 |
| Ozone inhibitor | 3 |

*Test A.—In natural rubber*

Using as the elastomer in the above Test Recipe, natural rubber, a natural polymer of isoprene, a conjugated diene, and having the ozone inhibitor present in an amount of 3 parts per hundred parts by weight of natural rubber, evaluating the efficiency of the ozone inhibitor in accord with the above Test For Ozone Inhibiting Efficiency, the following are the results:

| Ozone inhibitor—1,4-diamino-2,3,5-trimethyl-6-alkylbenzenes in which alkyl group is— | Rating—F/t control divided by F/t test piece |
|---|---|
| (1) Control—No ozone inhibitor | 1.0 |
| (2) Ethyl | 12.0 |
| (3) n-Butyl | 22.0 |
| (4) n-Dodecyl | 12.0 |
| (5) 3-cyclohexylpropyl | 38.0 |
| (6) 4-ethyl-5,5-dimethylhexyl | 400.0 |
| (7) 4-methylpentyl | 425.0 |

The ratings of efficiency of the 1,4-diamino-2,3,5-trimethyl-6-alkylbenzenes range in the above data from 12 to 1 for ozone inhibitor (2) to 425 to 1 for ozone inhibitor (7). Since all ratios are much greater than the 2.5 to 1 ratio, above referred to as indicative of ozone inhibitor efficiency, it follows that the above ozone inhibitors are extremely effective ozone inhibitors.

*Test B.—In GR–S Rubber*

Using as the elastomer in the above Test Recipe, synthetic GR–S rubber, a copolymer of 75 parts butadiene and 25 parts styrene, and having the ozone inhibitor present in an amount of 3 parts to 100 parts of rubber, and evaluating the efficiency of the ozone inhibitor in accord with the above Test For Ozone Inhibiting Efficiency, the following are the results:

| Ozone inhibitor | Rating—F/t control divided by F/t test piece |
|---|---|
| (a) None—Control | 1.0 |
| (b) 1,4-diamino-2,3,5-trimethyl-6-ethylbenzene | 48.0 |

The ozone inhibitors of this application are effective in increasing the resistance to deterioration caused by ozone on the GR–S rubber.

*Test C.—In oil-extended GR–S rubber*

Using as the elastomer in the above Test Recipe, oil-extended GR–S, having about 20% on weight of the rubber of an aromatic oil, and having the ozone inhibitor present in an amount of 3 parts to 100 parts of the oil-extended GR–S, evaluating the efficiency of the ozone inhibitor in accordance with the above Test For Ozone Inhibiting Efficiency, the following results were obtained:

| Ozone inhibitor | Rating—F/t control divided by F/t test piece |
|---|---|
| (a) None—Control | 1.0 |
| (b) 1,4-diamino-2,3,5-trimethyl-6-ethylbenzene | 40.0 |

The ozone inhibitors of this application are effective in retarding the deterioration caused by ozone acting on the oil-extended GR–S.

Test D.—In nitrile rubber

Using as the elastomer in the above Test Recipe, a synthetic nitrile rubber comprising the copolymer of butadiene and acrylonitrile, and having the ozone inhibitor present in an amount of 3 parts to 100 parts of rubber, evaluating the efficiency of the ozone inhibitor in accord with the above Test For Ozone Inhibiting Efficiency, the following results are obtained:

| Ozone inhibitor | Rating—F/t control divided by F/t test piece |
|---|---|
| (a) None—Control | 1.0 |
| (b) 1,4-diamino-2,3,5-trimethyl-6-ethylbenzene | 34.0 |

The ozone inhibitors of this application are effective in retarding the deterioration caused by ozone on nitrile rubbers.

Summarizing, the 1,4-diamino-2,3,5-trimethyl-6-alkylbenzenes of this application are shown in the above tests to be highly efficient ozone inhibitors for elastomers, which are unsaturated polymers of conjugated dienes, as well as copolymers of conjugated dienes with styrene and acrylonitrile. Further check tests demonstrate that the ozone inhibitors of this application retard the deterioration caused by ozone in products made with natural and synthetic unsaturated rubbers, such as polymers of conjugated dienes and copolymers of conjugated dienes with each other and with other unsaturated compounds copolymerizable therewith.

STAINING AND DISCOLORING TESTS

The 1,4-diamino-2,3,5-trimethyl-6-alkylbenzenes of this application are in themselves non-staining and non-discoloring. A test of these non-straining, non-discoloring properties with respect to one of the ozone inhibitors of this application, as for example, 1,4-diamino-2,3,5-trimethyl-6-ethylbenzene, will serve to demonstrate these properties. The following white sidewall recipe is employed:

Ingredients: Parts by weight
- Natural rubber _____ 100.0
- Zinc oxide _____ 85.0
- Titanium dioxide _____ 15.0
- Ultramarine blue _____ 0.2
- Stearic acid _____ 1.0
- Sulfur _____ 3.0
- Accelerator—Hepteen base _____ 0.3
- Antioxidant—AgeRite White [1] _____ 1.0
- Ozone inhibitor _____ 4.0

[1] AgeRite White is a widely used non-staining, non-discoloring antioxidant, being sym. di-beta-naphthyl-para-phenylenediamine.

For comparison, a composition of the above recipe without ozone inhibitor and a composition of the above recipe with 4 parts of ozone inhibitor were similarly compounded and given a like cure. Test pieces of the cured stocks were evaluated for discoloring by exposing to a standard RS sunlamp at a distance of 8 inches for 24 hours (ASTM procedure) to determine the discoloration of the rubber stock when exposed to light. Similar test pieces were evaluated for staining by placing them between white lacquered and white enameled refrigerator panels for 96 hours at 80° C. at a constant pressure of one pound per square inch.

| Ozone inhibitor | Staining | Discoloring |
|---|---|---|
| Control—None | 0.4 | 0.80 |
| 1,4-diamino-2,3,5-trimethyl-6-ethylbenzene | 0.4 | 0.80 |

The above test showed that white rubber stock containing the ozone inhibitors of the invention of this application, did not stain or discolor more than the same stock without the ozone inhibitor, and hence that the ozone inhibitor is a non-staining, non-discoloring ozone inhibitor.

Tests of the other above enumerated ozone inhibitors in vulcanized elastomer compositions indicate that the 1,4-diamino-2,3,5-trimethyl-6-alkylbenzenes, where the alkyl substituents are attached to the carbon atoms of the benzene nucleus, and no alkyl group is attached to an N of the amino groups, are as a class effective non-staining, non-discoloring ozone inhibitors in vulcanized elastomer products.

It is not the intention of the applicant to limit the invention of this application to the specific disclosure herein set forth, which has been presented as illustrative, since modifications in the proportions and types of materials employed may be varied and equivalent materials may be employed, where desirable, without departing from the spirit and scope of this invention as defined in the appended claims.

This application is a continuation-in-part of my earlier application Serial No. 499,763, filed April 6, 1955, which issued as United States Patent No. 2,851,438 on September 9, 1958.

What is claimed is:

1. A sulfur-vulcanized elastomer product possessing superior resistance to ozone deterioration comprising a sulfur-vulcanizable rubbery diolefin polymer sulfur-vulcanized in the presence of a substantially non-staining non-discoloring highly effective ozone inhibitor comprising a 1,4-diamino-2,3,5-trimethyl-6-alkyl-benzene wherein the alkyl group is a branched chain hydrocarbon radical selected from the class consisting of 3-cyclohexylpropyl, 4-ethyl-5,5-dimethylhexyl and 4-methylpentyl, and each of the amino groups is a —$NH_2$ group, the ozone inhibitor being intimately dispersed in the sulfur-vulcanized elastomer product in proportions ranging from about 0.5 to about 10 weight percent on the rubbery diolefin polymer.

2. The vulcanized elastomer product defined in claim 1 in which the alkyl group is 3-cyclohexylpropyl.

3. The vulcanized elastomer product defined in claim 1 in which the alkyl group is 4-ethyl-5,5-dimethylhexyl.

4. The vulcanized elastomer product defined in claim 1 in which the alkyl group is 4-methylpentyl.

5. The method of producing a sulfur-vulcanized elastomer product characterized by a high resistance to ozone deterioration which comprises vulcanizing a sulfur-vulcanizable rubbery diolefin polymer containing dispersed therethrough from about 0.5 to about 10 weight percent on the said polymer of a non-staining non-discoloring ozone inhibitor comprising a 1,4-diamino-2,3,5-trimethyl-6-alkylbenzene wherein the alkyl group is a branched chain hydrocarbon radical selected from the class consisting of 3-cyclohexylpropyl, 4-ethyl-5,5-dimethylhexyl and 4-methylpentyl, and each of the amino groups is a —$NH_2$ group, the ozone inhibitor being dispersed through the sulfur-vulcanized elastomer product to resist ozone deterioration.

6. The method of producing a vulcanized elastomer product as defined in claim 5 in which the said alkyl group is 3-cyclohexylpropyl.

7. The method of producing a vulcanized elastomer product as defined in claim 5 in which the said alkyl group is 4-ethyl-5,5-dimethylhexyl.

8. The method of producing a vulcanized elastomer product as defined in claim 5 in which the said alkyl group is 4-methylpentyl.

References Cited in the file of this patent

UNITED STATES PATENTS

| | | |
|---|---|---|
| 2,657,982 | Hill et al. | Nov. 3, 1953 |
| 2,681,271 | Cowie | June 15, 1954 |
| 2,851,438 | Tucker | Sept. 9, 1958 |